US008359859B2

(12) United States Patent
Shiraishi

(10) Patent No.: US 8,359,859 B2
(45) Date of Patent: Jan. 29, 2013

(54) TURBOCHARGER DEVICE

(75) Inventor: Keiichi Shiraishi, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 271 days.

(21) Appl. No.: 12/744,692

(22) PCT Filed: Apr. 10, 2009

(86) PCT No.: PCT/JP2009/057346
§ 371 (c)(1),
(2), (4) Date: Jun. 24, 2010

(87) PCT Pub. No.: WO2009/125836
PCT Pub. Date: Oct. 15, 2009

(65) Prior Publication Data
US 2010/0281863 A1 Nov. 11, 2010

(30) Foreign Application Priority Data

Apr. 11, 2008 (JP) ................................. 2008-103889

(51) Int. Cl.
*F02B 33/44* (2006.01)
(52) U.S. Cl. ............................. 60/612; 60/605.1; 60/611
(58) Field of Classification Search .................. 60/605.1, 60/611, 612
See application file for complete search history.

(56) References Cited

U.S. PATENT DOCUMENTS

| | | | | |
|---|---|---|---|---|
| 4,958,497 A | * | 9/1990 | Kawamura | 60/608 |
| 5,845,495 A | * | 12/1998 | Schray et al. | 60/612 |
| 6,324,846 B1 | * | 12/2001 | Clarke | 60/605.2 |
| 6,357,234 B1 | * | 3/2002 | Gladden | 60/612 |
| 2005/0188696 A1 | * | 9/2005 | Herz et al. | 60/612 |
| 2007/0234985 A1 | * | 10/2007 | Kolmanovsky | 123/90.15 |

FOREIGN PATENT DOCUMENTS

| | | |
|---|---|---|
| JE | 60-166716 | 8/1985 |
| JP | 04-054218 | 2/1992 |
| JP | 7-42567 | 2/1995 |
| JP | 2005-344633 | 12/2005 |

(Continued)

OTHER PUBLICATIONS

Supplementary European Search Report issued Jan. 27, 2012 in corresponding European Patent Application No. 09731059.3.

(Continued)

*Primary Examiner* — Thomas Denion
*Assistant Examiner* — Audrey K Bradley
(74) *Attorney, Agent, or Firm* — Wenderoth, Lind & Ponack, L.L.P.

(57) ABSTRACT

Provided are at least one exhaust turbine turbocharger (6) that has a turbine section (6a) and a compressor section (6b) and is constantly set in an operating mode when an engine unit (2) is in operation; at least one hybrid exhaust turbine turbocharger (7) that has a turbine section (7a), a compressor section (7b), and a generator (29) and is set to operate in parallel with the exhaust turbine turbocharger (6) when the engine unit (2) is in operation; and a controller (C) that receives a signal from a rotation sensor that is attached to the exhaust turbine turbocharger (6) and that detects the rotation speed of the exhaust turbine turbocharger (6), gives a command signal to the generator (29) in accordance with the signal, and controls an amount of electricity to be generated by the generator (29) so that the rotation speed of the hybrid exhaust turbine turbocharger (7) matches the rotation speed of the exhaust turbine turbocharger (6).

3 Claims, 3 Drawing Sheets

FOREIGN PATENT DOCUMENTS

JP  2008-101530  5/2008
JP  2008-255902  10/2008

OTHER PUBLICATIONS

International Search Report issued Jul. 14, 2009 in International (PCT) Application No. PCT/JP2009/057346.

Chinese Notification of the Grant of Patent Right for Invention issued Aug. 2, 2012 in corresponding Chinese Patent Application No. 200980101306.3 with explanation of relevance.

A Decision to Grant a Patent issued Nov. 7, 2012 in corresponding European Patent Application No. 09731059.3-1263.

* cited by examiner

TURBOCHARGER DEVICE

TECHNICAL FIELD

The present invention relates to turbocharger devices equipped with a plurality of turbochargers that increase the pressure of supply air by utilizing exhaust, and particularly, to a turbocharger device suitably installed in a marine diesel engine, a diesel engine for a land-based generator, or the like.

BACKGROUND ART

A known example of a turbocharger device equipped with a plurality of turbochargers that increase the pressure of supply air by utilizing exhaust is disclosed in Patent Citation 1.
Patent Citation 1:
Japanese Unexamined Patent Application, Publication No. Sho 60-166716 (FIG. 1)

DISCLOSURE OF INVENTION

In recent years, from the standpoint of energy conservation, there has been a growing demand for use of a so-called hybrid exhaust turbine turbocharger, equipped with a generator that recovers the energy of exhaust gas as electrical power, as at least one of a plurality of turbochargers.

However, in a turbocharger device having a mixture of a hybrid exhaust turbine turbocharger equipped with a generator and an exhaust turbine turbocharger not equipped with a generator, the exhaust turbine turbocharger is operated at an optimal rotation speed in accordance with the load of a diesel engine, whereas the hybrid exhaust turbine turbocharger is operated at a rotation speed lower than the optimal rotation speed since the drive power is used (consumed) by the generator. Therefore, simply changing an exhaust turbine turbocharger to a hybrid exhaust turbine turbocharger can cause the flow rate through a compressor section of the hybrid exhaust turbine turbocharger to decrease, possibly causing surging to occur in the hybrid exhaust turbine turbocharger.

In order to control the rotation speed of the hybrid exhaust turbine turbocharger so as to prevent the occurrence of surging, an expensive controller that can instantaneously perform complicated calculations is required, which disadvantageously leads to an increase in the cost of manufacture.

The present invention has been made in view of the circumstances described above, and an object thereof is to provide a turbocharger device that can control the rotation speed of the hybrid exhaust turbine turbocharger with a simple configuration without having to use an expensive controller that instantaneously performs complicated calculations, so as to reduce the cost of manufacture and prevent surging of the hybrid exhaust turbine turbocharger.

In order to solve the aforementioned problems, the present invention provides the following solutions.

A turbocharger device according to an aspect of the present invention includes at least one exhaust turbine turbocharger that has a turbine section driven by exhaust gas guided from an engine unit and a compressor section driven by the turbine section so as to pump ambient air to the engine unit, and that is constantly set in an operating mode when the engine unit is in operation; at least one hybrid exhaust turbine turbocharger that has a turbine section driven by the exhaust gas guided from the engine unit, a compressor section driven by the turbine section so as to pump the ambient air to the engine unit, and a generator having a rotation shaft coupled to a rotation shaft of the turbine section and the compressor section, and that is set to operate in parallel with the exhaust turbine turbocharger when the engine unit is in operation; and a controller that receives a signal from a rotation sensor that is attached to the exhaust turbine turbocharger and that detects the rotation speed of the exhaust turbine turbocharger, gives a command signal to the generator of the hybrid exhaust turbine turbocharger in accordance with the signal, and controls an amount of electricity to be generated by the generator so that the rotation speed of the hybrid exhaust turbine turbocharger matches the rotation speed of the exhaust turbine turbocharger.

With the turbocharger device according to the above aspect, since the rotation speed of the hybrid exhaust turbine turbocharger can be made to match the rotation speed of the exhaust turbine turbocharger with a simple configuration without having to use an expensive controller that instantaneously performs complicated calculations, the cost of manufacture can be reduced, and surging of the hybrid exhaust turbine turbocharger can be prevented.

With a diesel engine equipped with the turbocharger device according to the aspect of the present invention, since surging of the hybrid exhaust turbine turbocharger that constitutes the turbocharger device is prevented, turbocharged air (ambient air) with optimal pressure is constantly supplied (accumulated) into an intake manifold and a cylinder that constitute the diesel engine, thereby stably improving the engine output and enhancing the reliability of the entire engine.

A method of operating a turbocharger device according to an aspect of the present invention is a method of operating a turbocharger device that includes at least one exhaust turbine turbocharger that has a turbine section driven by exhaust gas guided from an engine unit and a compressor section driven by the turbine section so as to pump ambient air to the engine unit, and that is constantly set in an operating mode when the engine unit is in operation; at least one hybrid exhaust turbine turbocharger that has a turbine section driven by the exhaust gas guided from the engine unit, a compressor section driven by the turbine section so as to pump the ambient air to the engine unit, and a generator having a rotation shaft coupled to a rotation shaft of the turbine section and the compressor section, and that is set to operate in parallel with the exhaust turbine turbocharger when the engine unit is in operation; and a controller that receives a signal from a rotation sensor that is attached to the exhaust turbine turbocharger and that detects the rotation speed of the exhaust turbine turbocharger, and gives a command signal to the generator of the hybrid exhaust turbine turbocharger in accordance with the signal, the method including controlling an amount of electricity to be generated by the generator by using the controller so that the rotation speed of the hybrid exhaust turbine turbocharger matches the rotation speed of the exhaust turbine turbocharger when the engine unit is in operation.

With the method of operating a turbocharger device according to the aspect of the present invention, since the rotation speed of the hybrid exhaust turbine turbocharger can be made to match the rotation speed of the exhaust turbine turbocharger with a simple configuration without having to use an expensive controller that instantaneously performs complicated calculations, the cost of manufacture can be reduced, and surging of the hybrid exhaust turbine turbocharger can be prevented.

The turbocharger device according to the present invention advantageously has the ability to control the rotation speed of the hybrid exhaust turbine turbocharger with a simple configuration without having to use an expensive controller that instantaneously performs complicated calculations, so that the cost of manufacture can be reduced and surging of the hybrid exhaust turbine turbocharger can be prevented.

EXPLANATION OF REFERENCE

Figure 1:
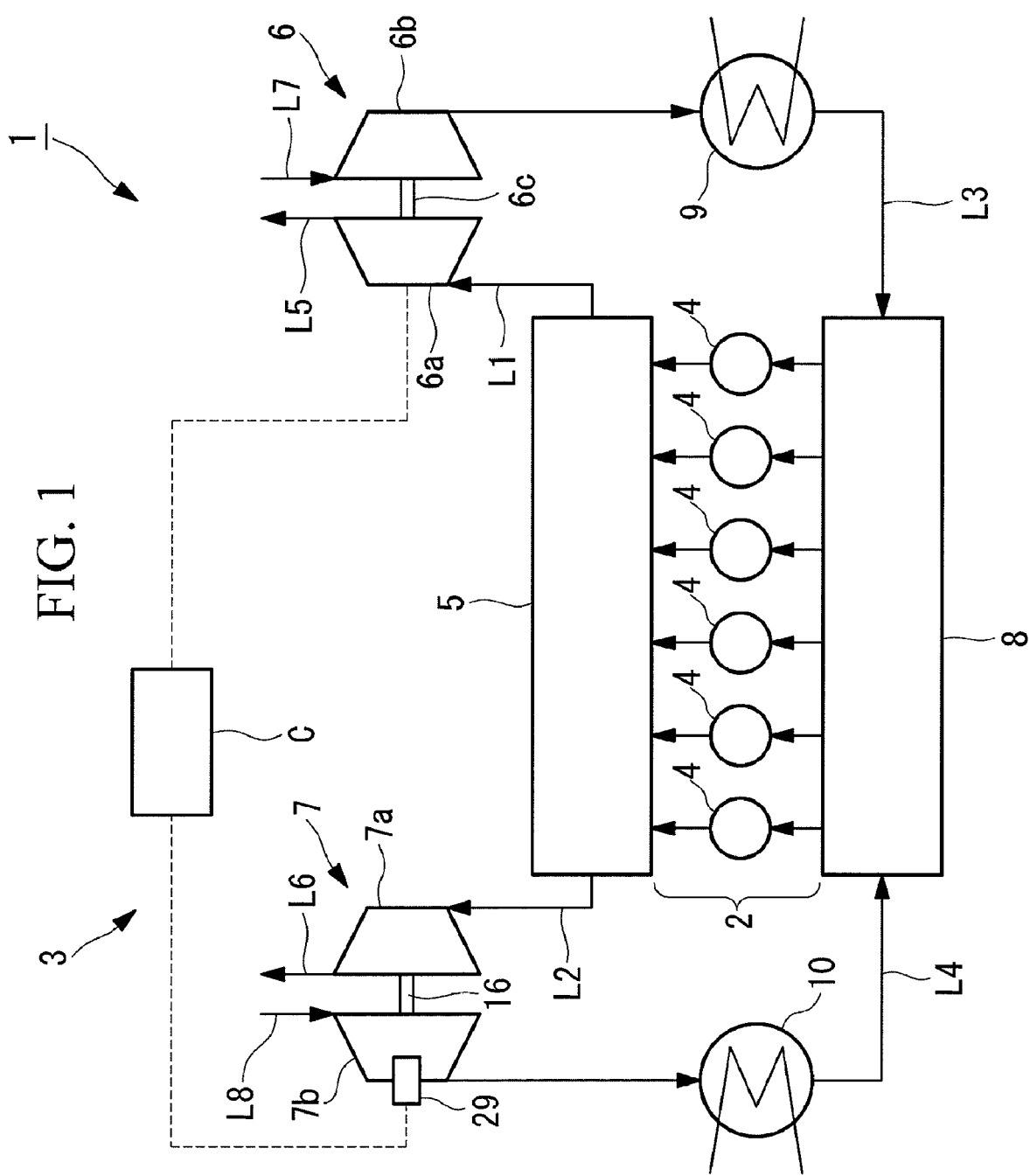
FIG. 1 is a schematic configuration diagram of a marine diesel engine equipped with a turbocharger device according to an embodiment of the present invention.

1: marine diesel engine
2: engine unit
3: turbocharger device
6: exhaust turbine turbocharger
6a: turbine section
6b: compressor section
7: hybrid exhaust turbine turbocharger
7a: turbine section
7b: compressor section
11: exhaust gas
13: ambient air
16: rotation shaft
29: generator
29a: rotation shaft
C: controller

BEST MODE FOR CARRYING OUT THE INVENTION

An embodiment of a turbocharger device according to the present invention will be described below with reference to FIGS. 1 to 3.

Figure 2:
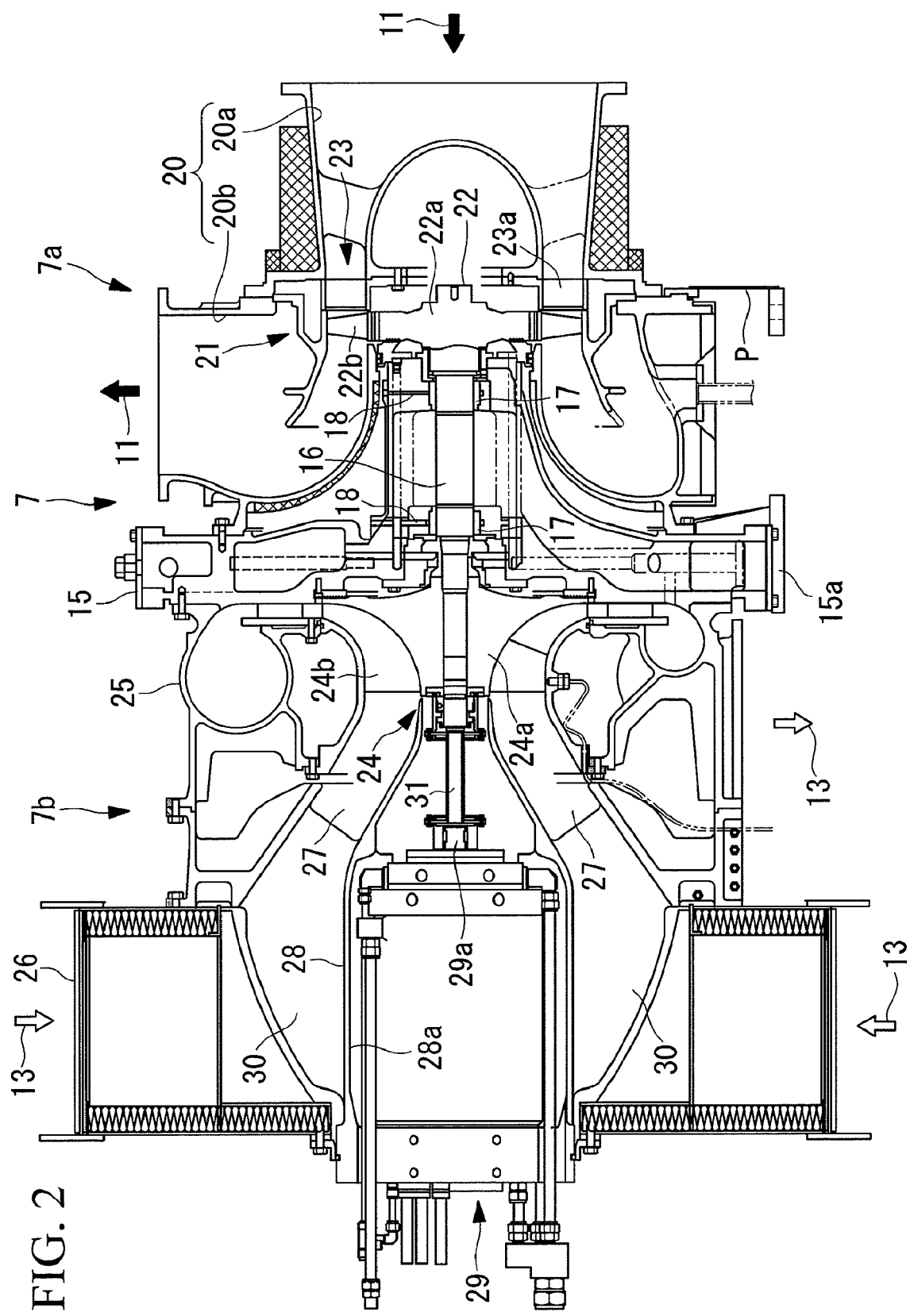
FIG. 2 is a longitudinal sectional view of a hybrid exhaust turbine turbocharger shown in FIG. 1.
Figure 3:
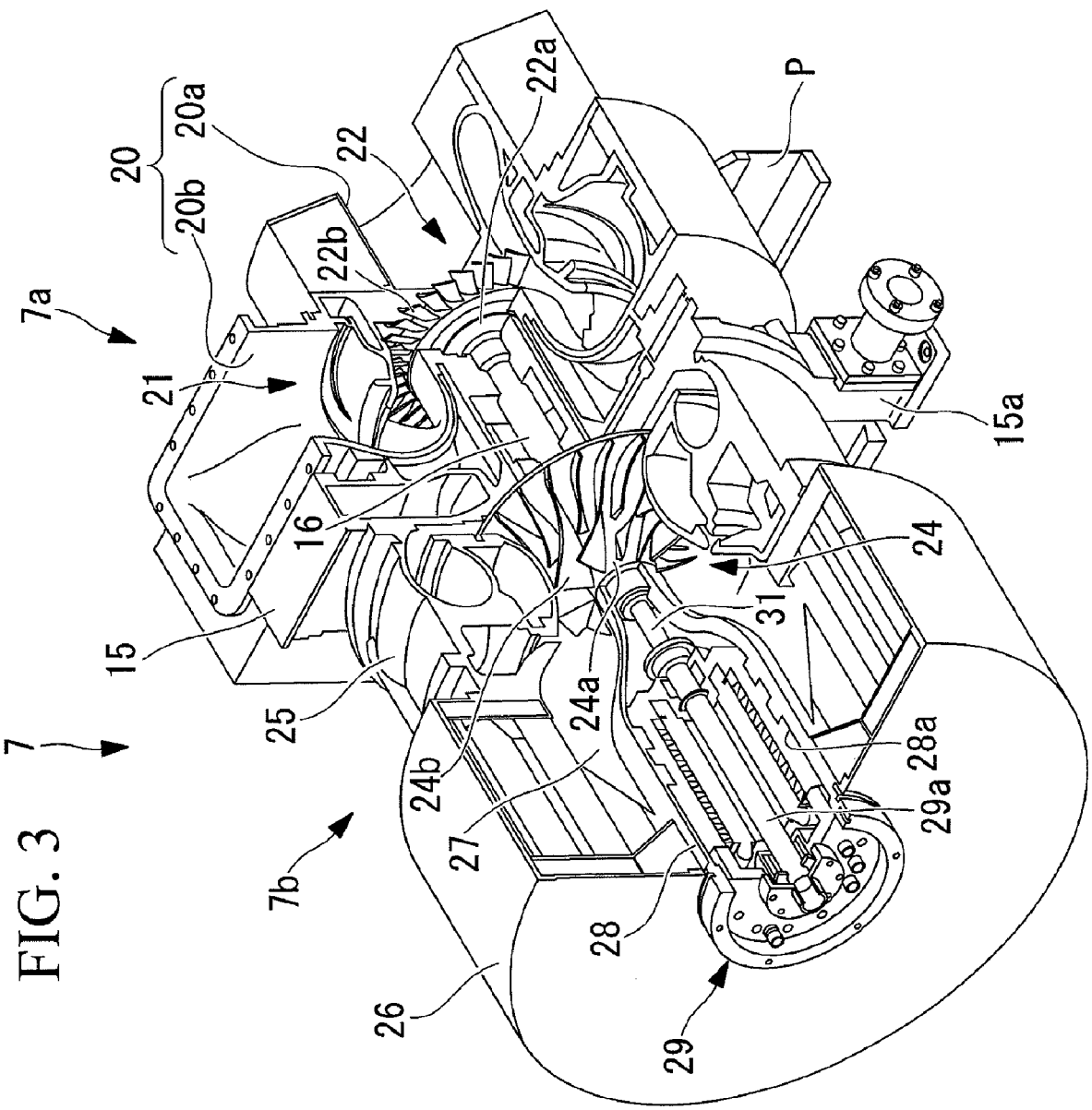
FIG. 3 is a partially cutaway perspective view of the hybrid exhaust turbine turbocharger shown in FIG. 2, as viewed from a silencer side.

FIG. 1 is a schematic configuration diagram of a marine diesel engine equipped with the turbocharger device according to this embodiment, FIG. 2 is a longitudinal sectional view of a hybrid exhaust turbine turbocharger shown in FIG. 1, and FIG. 3 is a partially cutaway perspective view of the hybrid exhaust turbine turbocharger shown in FIG. 2, as viewed from a silencer side.

As shown in FIG. 1, a marine diesel engine 1 includes a diesel engine unit (e.g., low-speed two-cycle diesel engine) 2 and a turbocharger device 3.

A screw propeller (not shown) is directly or indirectly attached, via a propeller shaft (not shown), to a crankshaft (not shown) that constitutes the diesel engine unit (referred to as "engine unit" hereinafter) 2. Furthermore, the engine unit 2 is provided with cylinder sections 4 each constituted of a cylinder liner (not shown), a cylinder cover (not shown), and the like, and a piston (not shown) coupled to the crankshaft is disposed in each cylinder section 4. Moreover, an exhaust port (not shown) of each cylinder section 4 is connected to an exhaust manifold 5, and the exhaust manifold 5 is connected, via a first exhaust pipe L1, to an inlet side of a turbine section 6a of an exhaust turbine turbocharger 6 that constitutes the turbocharger device 3, and is also connected, via a second exhaust pipe L2, to an inlet side of a turbine section 7a of a hybrid exhaust turbine turbocharger 7 that constitutes the turbocharger device 3. On the other hand, an intake port (not shown) of each cylinder section 4 is connected to an intake manifold 8, and the intake manifold 8 is connected to a compressor section 6b of the exhaust turbine turbocharger 6 via a first intake pipe L3 and is also connected to a compressor section 7b of the hybrid exhaust turbine turbocharger 7 via a second intake pipe L4.

Exhaust gas passing through the turbine sections 6a and 7a is guided to a funnel (not shown) via exhaust pipes L5 and L6 connected to outlet sides of the turbine sections 6a and 7a, and is subsequently ejected outside a vessel.

Silencers (not shown) are disposed in intake pipes L7 and L8 connected to inlet sides of the compressor sections 6b and 7b, and ambient air passing through the silencers is guided to the compressor sections 6b and 7b. On the other hand, air coolers (intercoolers) 9 and 10, surge tanks (not shown), and the like are connected to intermediate sections of the intake pipes L3 and L4 connected to the outlet sides of the compressor sections 6b and 7b, and the ambient air passing through the compressor sections 6b and 7b passes through these air coolers 9 and 10, surge tanks, and the like before being supplied to the intake manifold 8 of the engine unit 2.

The turbocharger device 3 according to this embodiment includes at least one (one in this embodiment) exhaust turbine turbocharger 6, at least one (one in this embodiment) hybrid exhaust turbine turbocharger 7, and a controller C.

Main components that constitute the exhaust turbine turbocharger 6 include the turbine section 6a driven by exhaust gas (combustion gas) guided from the engine unit 2 via the first exhaust pipe L1, the compressor section 6b driven by this turbine section 6a so as to pump ambient air to the engine unit 2, and a casing (not shown) provided between the turbine section 6a and the compressor section 6b and supporting these sections.

A rotation shaft 6c one end of which protrudes toward the turbine section 6a and the other end of which protrudes toward the compressor section 6b extends through the casing. The one end of the rotation shaft 6c is attached to a turbine disk (not shown) of a turbine rotor (not shown) that constitutes the turbine section 6a, whereas the other end of the rotation shaft 6c is attached to a hub (not shown) of a compressor impeller (not shown) that constitutes the compressor section 6b.

As shown in FIG. 2 or 3, main components that constitute the hybrid exhaust turbine turbocharger 7 include the turbine section 7a driven by exhaust gas (combustion gas) 11 guided from the engine unit 2 via the second exhaust pipe L2 (see FIG. 1), the compressor section 7b driven by this turbine section 7a so as to pump ambient air 13 to the engine unit 2, and a casing 15 provided between the turbine section 7a and the compressor section 7b and supporting these sections.

A rotation shaft 16 one end of which protrudes toward the turbine section 7a and the other end of which protrudes toward the compressor section 7b extends through the casing 15. The rotation shaft 16 is rotatably supported about an axis by bearings 17 provided in the casing 15. Moreover, the casing 15 is provided with lubricant supply channels 18 that supply a lubricant from a lubricant reservoir (not shown) to the bearings 17.

On the other hand, a lower end of the casing 15 serves as a leg portion 15a that supports the casing 15 at one point in the axial direction of the rotation shaft 16 (or sometimes at two or more points in a direction orthogonal to the axial direction of the rotation shaft 16), and this leg portion 15a is fixed to a base (not shown) set on the floor. Specifically, the weight of the hybrid exhaust turbine turbocharger 7 is transmitted to the base via the leg portion 15a.

Reference character P in the drawings denotes a punching plate. One end of the punching plate P is fixed to a lower end of the turbine section 7a, and the other end thereof is fixed to the base, like the leg portion 15a of the casing 15. The main purpose of this punching plate P is not to support the weight of the hybrid exhaust turbine turbocharger 7, like the leg portion 15a, but to prevent the hybrid exhaust turbine turbocharger 7 from shaking (vibrating) relative to the base.

The turbine section 7a has an exhaust gas channel 20 that is connected to an outlet of the second exhaust pipe L2 so as to receive the exhaust gas 11, and a turbine 21 that is rotationally driven by receiving the flow of the exhaust gas 11 supplied into the exhaust gas channel 20.

The turbine 21 includes a turbine rotor 22 and a turbine nozzle 23. The turbine rotor 22 includes a disk-shaped turbine disk 22a provided at the one end of the rotation shaft 16 and a plurality of turbine blades 22b attached to the periphery of the turbine disk 22a and each having an airfoil shape in cross section.

The turbine nozzle 23 is constituted of a plurality of annularly-arranged nozzle guide vanes 23a and is disposed on the upstream side of the turbine blades 22b.

The exhaust gas channel 20 has a supply channel 20a that is connected to the outlet end of the second exhaust pipe L2 and guides the exhaust gas 11 to the nozzle guide vanes 23a and the turbine blades 22b, and also has a delivery channel 20b that is provided radially outward of the turbine 21 and guides the exhaust gas 11 passing through the turbine 21 to the funnel (not shown) via the exhaust pipe L6 (see FIG. 1).

The compressor section 7b has a compressor impeller 24 that delivers the ambient air 13 radially outward when rotationally driven, and a centrifugal chamber 25 that surrounds the compressor impeller 24 and compresses the ambient air 13 delivered by the compressor impeller 24.

The compressor impeller 24 includes a substantially disk-shaped hub 24a attached to the other end of the rotation shaft 16 and a plurality of blades 24b extending radially outward from the outer surface of the hub 24a and annularly provided in the circumferential direction.

A silencer 26 connected to an supply system of the engine unit 2 is disposed adjacent to the upstream side of the compressor section 7b, and the ambient air 13 passing through this silencer 26 is guided to the blades 24b of the compressor impeller 24 via an inflow channel 27. The second intake pipe L4 disposed on the downstream side of the compressor section 7b is connected to the air cooler (intercooler) 10, the surge tank (not shown), and the like, and the ambient air 13 passing through the centrifugal chamber 25 passes through the air cooler 10, the surge tank, and the like before being supplied to the intake manifold 8.

In a midsection of the silencer 26 is provided a shell housing 28 having a recess 28a that tapers toward an end surface of the hub 24a, and a (high-speed induction) generator 29 is accommodated within the recess 28a. The shell housing 28 is fixed to the compressor section 7b (i.e., a radially outer wall that forms the inflow channel 27) via a plurality of (e.g., four) supports 30 provided within the inflow channel 27. An outer surface of the shell housing 28 constitutes a radially inner wall that forms the inflow channel 27.

A rotation shaft 29a of the generator 29 is disposed so as to be positioned on the same rotation axis as that of the rotation shaft 16 and is coupled, via a coupling 31, to the tip of one end of the rotation shaft 16 extending through the hub 24a and protruding towards the silencer 26. Specifically, the rotation shaft 29a of the generator 29 rotates together with the rotation shaft 16.

The generator 29 is electrically connected to a switchboard etc. separately installed in the vessel (in an engine room in this embodiment), so that electrical power generated by the generator 29 can be used (utilized) as a source of power in the vessel.

The controller C receives a signal from a rotation sensor (not shown) that is attached to the exhaust turbine turbocharger 6 and that detects the rotation speed of the exhaust turbine turbocharger 6, sends (gives) a command signal to the generator 29 of the hybrid exhaust turbine turbocharger 7 in accordance with the signal, and controls the amount of electricity to be generated by the generator 29 so that the rotation speed of the hybrid exhaust turbine turbocharger 7 is made equal to (matches) the rotation speed of the exhaust turbine turbocharger 6.

In this embodiment, for example, an output of the hybrid exhaust turbine turbocharger 7 is set so as to be increased by an amount equivalent to the desired amount of electricity to be generated by the generator 29 during regular sailing (e.g., ocean sailing) where there is not much (hardly any) change in the load condition of the engine unit 2. Specific examples of a method for increasing the output of the hybrid exhaust turbine turbocharger 7 include a method of making the exhaust gas 11 flow into (pass through) the turbine section 7a by a flow rate greater than a flow rate of exhaust gas 11 flowing into the turbine section 6a (for example, 1.25 times the rate of exhaust gas 11 flowing into the turbine section 6a) and a method of making the ambient air 13 flow into (pass through) the compressor section 7b by a flow rate lower than a flow rate of ambient air 13 flowing into the compressor section 6b (for example, 0.8 times the rate of ambient air 13 flowing into the compressor section 6b).

With the turbocharger device 3 according to this embodiment, since the rotation speed of the hybrid exhaust turbine turbocharger 7 can be made to match the rotation speed of the exhaust turbine turbocharger 6 with a simple configuration without having to use an expensive controller that instantaneously performs complicated calculations, the cost of manufacture can be reduced, and surging of the hybrid exhaust turbine turbocharger 7 can be prevented.

Although the above-described embodiment is directed to a marine diesel engine equipped with one exhaust turbine turbocharger 6 and one hybrid exhaust turbine turbocharger 7, the present invention is not limited to this and may be applied to a marine diesel engine equipped with two or more exhaust turbine turbochargers 6 and/or two or more hybrid exhaust turbine turbochargers 7.

The invention claimed is:

1. A turbocharger device in an engine system comprising: at least one exhaust turbine turbocharger that has a turbine section driven by exhaust gas guided from an engine unit and a compressor section driven by the turbine section so as to pump ambient air to the engine unit, and that is constantly set in an operating mode when the engine unit is in operation; at least one hybrid exhaust turbine turbocharger that has a hybrid turbine section driven by the exhaust gas guided from the engine unit, a hybrid compressor section driven by the hybrid turbine section so as to pump the ambient air to the engine unit, and a generator having a rotation shaft coupled to a rotation shaft of the hybrid turbine section and the hybrid compressor section, and that is set to operate in parallel with the exhaust turbine turbocharger when the engine unit is in operation; and a controller that receives a signal from a rotation sensor that is attached to the exhaust turbine turbocharger and that detects the rotation speed of the exhaust turbine turbocharger, gives a command signal to the generator of the hybrid exhaust turbine turbocharger in accordance with the signal, and controls an amount of electricity to be generated by the generator so that the rotation speed of the hybrid exhaust turbine turbocharger matches the rotation speed of the exhaust turbine turbocharger.

2. A method of operating a turbocharger device in an engine system that includes: at least one exhaust turbine turbocharger that has a turbine section driven by exhaust gas guided from an engine unit and a compressor section driven by the turbine section so as to pump ambient air to the engine unit, and that is constantly set in an operating mode when the engine unit is in operation; at least one hybrid exhaust turbine turbocharger that has a hybrid turbine section driven by the exhaust gas guided from the engine unit, a hybrid compressor section driven by the hybrid turbine section so as to pump the ambient air to the engine unit, and a generator having a rotation shaft coupled to a rotation shaft of the hybrid turbine section and the hybrid compressor section, and that is set to operate in parallel with the exhaust turbine turbocharger when the engine unit is in operation; and a controller that receives a signal from a rotation sensor that is attached to the exhaust turbine turbocharger and that detects the rotation speed of the exhaust turbine turbocharger, and gives a command signal to the generator of the hybrid exhaust turbine turbocharger in accordance with the signal, the method comprising: controlling an amount of electricity to be generated by the generator by using the controller so that the rotation speed of the hybrid exhaust turbine turbocharger matches the rotation speed of the exhaust turbine turbocharger when the engine unit is in operation.

3. A turbocharger device in a diesel engine system comprising: at least one exhaust turbine turbocharger that has a turbine section driven by exhaust gas guided from a diesel engine unit and a compressor section driven by the turbine section so as to pump ambient air to the diesel engine unit, and that is constantly set in an operating mode when the diesel engine unit is in operation; at least one hybrid exhaust turbine turbocharger that has a hybrid turbine section driven by the exhaust gas guided from the diesel engine unit, a hybrid compressor section driven by the hybrid turbine section so as to pump the ambient air to the diesel engine unit, and a generator having a rotation shaft coupled to a rotation shaft of the hybrid turbine section and the hybrid compressor section, and that is set to operate in parallel with the exhaust turbine turbocharger when the diesel engine unit is in operation; and a controller that receives a signal from a rotation sensor that is attached to the exhaust turbine turbocharger and that detects the rotation speed of the exhaust turbine turbocharger, gives a command signal to the generator of the hybrid exhaust turbine turbocharger in accordance with the signal, and controls an amount of electricity to be generated by the generator so that the rotation speed of the hybrid exhaust turbine turbocharger matches the rotation speed of the exhaust turbine turbocharger.

* * * * *